United States Patent [19]

Yamashita

[11] Patent Number: 4,623,944
[45] Date of Patent: Nov. 18, 1986

[54] MAGNETIC TAPE GUIDE DRUM WITH GROUNDING DEVICE

[75] Inventor: Tatsumaro Yamashita, Miyagi, Japan

[73] Assignee: Alps Electric Co., Ltd., Japan

[21] Appl. No.: 637,165

[22] Filed: Aug. 2, 1984

[30] Foreign Application Priority Data

Aug. 2, 1983 [JP] Japan .......................... 58-119828[U]

[51] Int. Cl.⁴ .......................................... G11B 5/027
[52] U.S. Cl. ........................................ 360/84; 360/85
[58] Field of Search ............................. 360/84–85; 310/232–236, 249, 248, 251; 29/826

[56] References Cited

U.S. PATENT DOCUMENTS 3,588,378  6/1971  Protas ..................................... 360/84
4,369,473  1/1983  Eibensteiner ......................... 360/84
4,447,752  5/1984  Boyce et al. ......................... 310/232

FOREIGN PATENT DOCUMENTS 57-162120  10/1982  Japan .

Primary Examiner—John H. Wolff
Assistant Examiner—Matthew J. Bussan
Attorney, Agent, or Firm—Guy W. Shoup

[57] ABSTRACT

A magnetic tape guide drum for a magnetic video recording and playback apparatus has a rotary magnetic head and is adapted for guiding a magnetic tape traveling spirally about the drum. The drum includes a rotary drum portion, a stationary drum portion and a shaft secured to the rotary drum portion and supported rotatably by the stationary drum portion for rotating the rotary drum portion. A grounding device is provided in the stationary drum portion and held in sliding contact with the peripheral surface of the shaft.

7 Claims, 5 Drawing Figures

MAGNETIC TAPE GUIDE DRUM WITH GROUNDING DEVICE

BACKGROUND OF THE INVENTION

1. Field of the Invention

This invention relates to a guide for the magnetic tape of video recording and playback apparatus having a rotary magnetic head, and more particularly, to its grounding structure.

2. Description of the Prior Art

A magnetic video recording and playback apparatus usually has a tape conveying system such as that shown in FIG. 1. A magnetic tape 2 leaving a supply reel 1 travels past a guide post 3A, a tension post 4, loading posts 5A to 5C, a sound erasing head 6 and a guide post 3B, and makes about a half turn spirally around a magnetic tape guide drum 7. The drum 7 is provided with at least one head for shortwave recording and playback on the magnetic tape 2. The tape 2 leaving the drum 7 travels past a guide post 8A, a sound re-recording head 9, a guide post 8B, a capstan 10, a pinch roller 11, a loading post 12 and a guide post 13, and is wound on a takeup reel 14. A half of a cassette housing is shown at 15, and the lower portions of loading grooves are shown at 16 and 17.

The magnetic tape guide drum 7 is constructed as shown by way of example in FIG. 2. The drum 7 comprises a stationary drum portion 18 and a rotary drum portion 19 disposed coaxially with the stationary drum portion 18. The rotary drum portion 19 is equal in outside diameter to the stationary drum portion 18. The stationary and rotary drum portions 18 and 19 have a clearance 20 therebetween. A supporting shaft 22 is secured to the center of the rotary drum portion 19 by a sleeve 21. A cylindrical permanent magnet 25A surrounds the shaft 22 and is supported on its lower end by a bearing sleeve 23 and a housing 24. A pair of bearing members 26A and 26B are provided in the stationary drum portion 18 for supporting the shaft 22 and thereby the rotary drum portion 19 rotatably. The stationary drum portion 18 is also provided with a drive coil 25B which is encircled by the permanent magnet 25A. The magnet 25A and the coil 25B constitute a motor. The rotary drum portion 19 is provided with a magnetic head 27 having a signal writing or reading terminal which is directed radially outwards in the clearance 20. A pair of rotary transformers 28A and 28B are provided between the stationary and rotary drum portions 18 and 19 so that recording or playback signals for the magnetic tape 2 may be transmitted through the transformers 28A and 28B from the stationary drum portion 18 connected to an electrical signal system.

Static electricity is generated by the sliding contact of the magnetic tape 2 with the rotary drum portion 19, and has an adverse effect on a very small signal for recording or playback. The static electricity may be transmitted to the bearing members 26A and 26B and result in irregular sliding motion for the shaft 22. For grounding purposes, a spring member 30 having a sliding contact 29 resting on the shaft 22 is connected to a connecting member 31 which is attached to a chassis not shown, or the like. The end of the shaft 22 on which the sliding contact 29 rests, however, does not have a mirror surface, but generates a sliding noise. It is necessary that the spring member 30 and the connecting member 31 be sufficiently long not to interfere with the operation of the rotary drum portion 19. This requirement makes the whole apparatus undesirably tall and large. The structure of FIG. 2 has also the disadvantage of including the various members for grounding the shaft 22 and the members for securing them, and accordingly can be expensive.

SUMMARY OF THE INVENTION

It is an object of this invention to eliminate the drawbacks of the prior art as hereinabove pointed out and provide a magnetic tape guide drum which facilitates grounding, does not generate any appreciable sliding noise, and is inexpensive.

This object is attained by a sliding contact disposed within a magnetic tape guide drum and resting on the outer peripheral surface of a shaft for supporting the rotary portion of the drum, and connected to an external grounding device.

According to this invention, the use of a sliding contact for grounding purposes does not result in the generation of any appreciable noise, or any undesirably large or expensive apparatus.

DETAILED DESCRIPTION OF THE INVENTION

Figure 1:
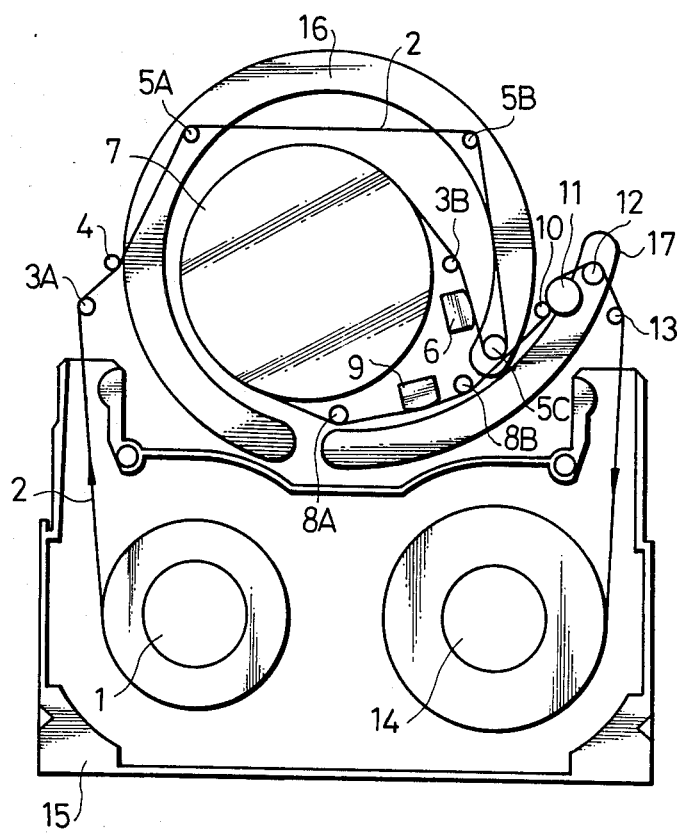
FIG. 1 is a view showing a system for conveying a magnetic tape in a magnetic video recording and playback apparatus.
Figure 2:
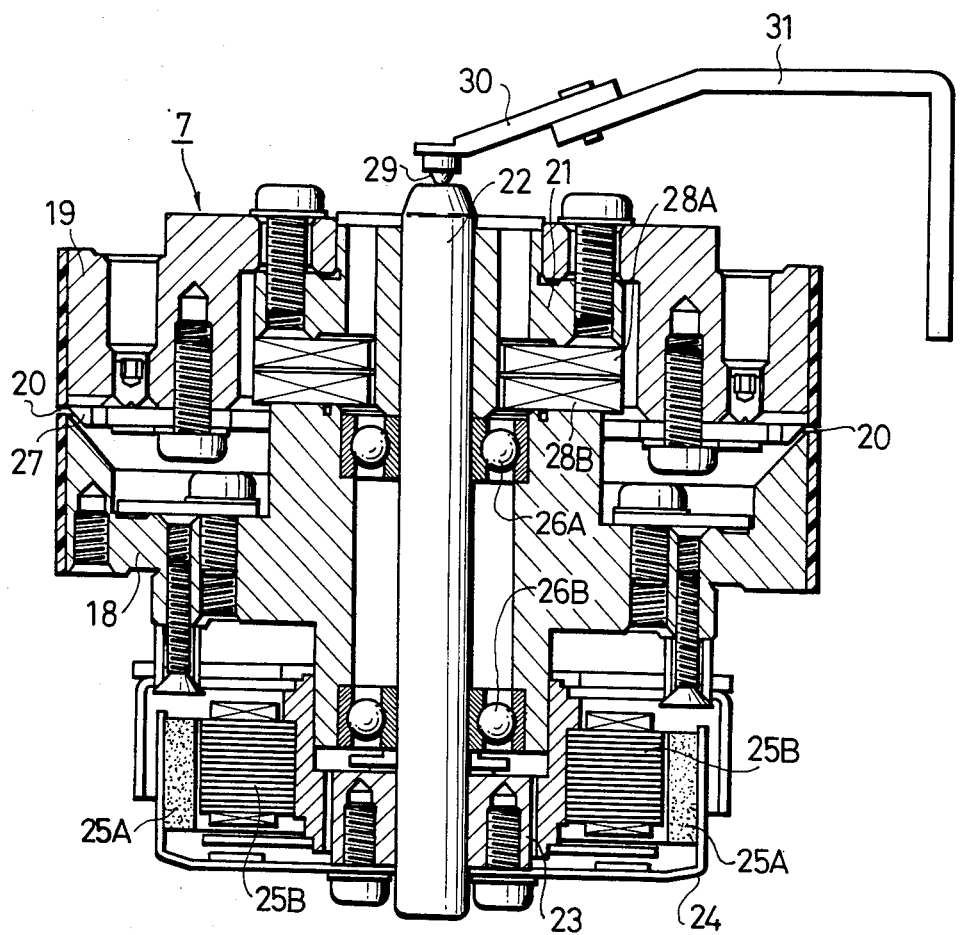
FIG. 2 is a longitudinal sectional view of a conventional magnetic tape guide drum.
Figure 3:
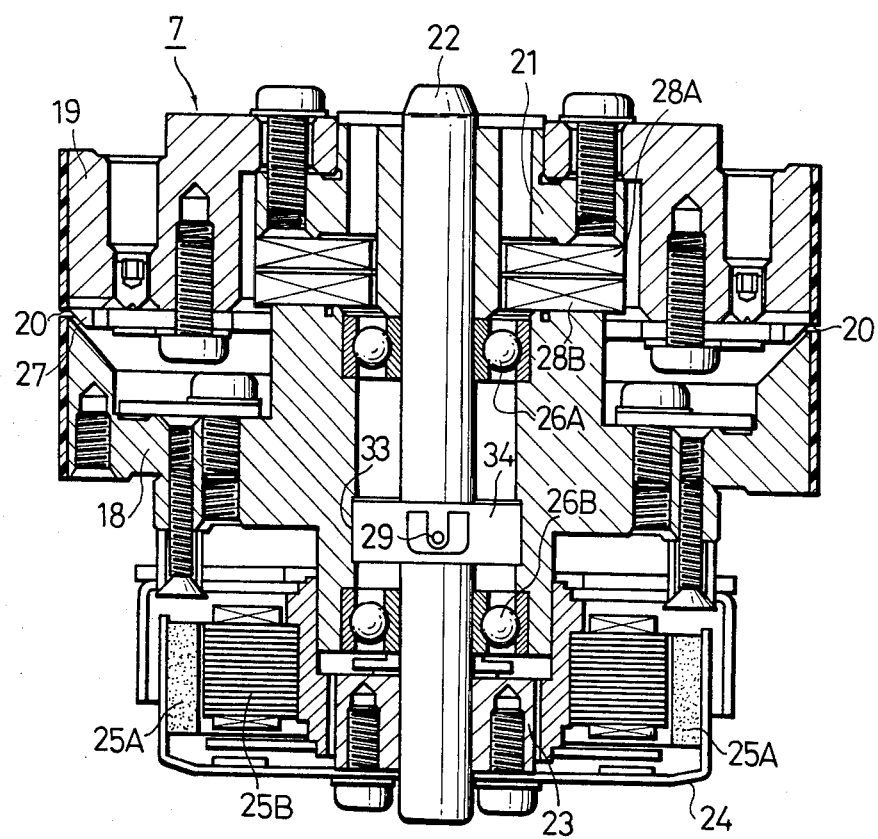
FIG. 3 is a longitudinal sectional view of a magnetic tape guide drum embodying this invention.

A magnetic tape guide drum embodying this invention is generally shown at 7 in FIG. 3. It differs from the drum of FIG. 2 in the construction and location of the sliding contact. Parts similar to parts illustrated in FIG. 2 are identified by the same reference numerals, and will not be described. The drum of FIG. 3 is characterized by a cylindrical member 34 having a sliding contact 29 bent inwardly to engage the outer peripheral surface of the supporting shaft 22. The stationary portion 18 of the drum 7 has a recess 33 provided between the bearing members 26A and 26B and surrounding the shaft 22. The cylindrical member 34 has an outer wall surface secured to the recess 33. The cylindrical member 34 is formed from an electrically conductive and resilient material. The static electricity forming on the rotary portion 19 of the drum 7 is transmitted to an external grounding device, such as a chassis, through the shaft 22, the sliding contact 29, the cylindrical member 34 and the stationary drum portion 18. As the sliding contact 29 is located within the drum 7, there is substantially no noise produced by the sliding contact between the shaft 22 and the sliding contact 29 that can effect operation. The sliding contact 29 and its associated structure are easy and inexpensive to provide. They do not interfere with the operation of the rotary drum portion 19; therefore, the apparatus is, as a whole, compact in construction.

Figure 4:
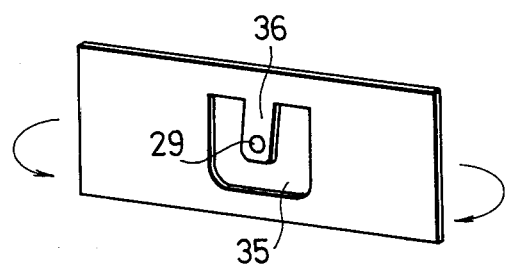
FIG. 4 is an exploded perspective view of a cylindrical member having a sliding contact for grounding purposes.
Figure 5:
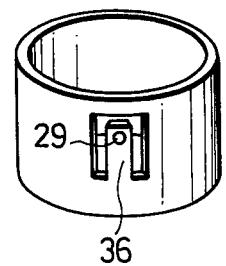
FIG. 5 is a perspective view of another cylindrical member having a sliding contact.

The cylindrical member 34 may be formed from a metal plate having a hole 35 in its center, and an outwardly directed resilient tongue 36 projecting from one edge of the hole 3, as shown in FIG. 4. The sliding contact 29 is secured to the tongue 36 in the vicinity of its free end, and the metal plate is bent cylindrically in the direction of the arrows to form the cylindrical member 34. Alternatively, a hole may be cut in the wall of an electrically conductive cylinder of metal or a conductive synthetic resin to form a resilient tongue 36 so that the sliding contact 29 may be attached to the tongue 36. Alternatively, it is possible to omit the sliding contact 29 and form the tongue 36 with a projection which serves as the sliding contact 29. Although FIG. 3 shows the recess 33 for holding the cylindrical member 34 on the stationary drum portion 18, the cylindrical member 34 may be held in position by only its own resiliency.

What is claimed is:

1. In a magnetic tape guide drum for a magnetic video recording and playback apparatus, said drum having a rotary magnetic head and adapted for guiding a magnetic tape travelling spirally about said drum, said drum comprising a rotary drum portion mounting said magnetic head, a stationary drum portion and a shaft secured to said rotary drum portion and supported rotatably by said stationary drum portion for rotating said rotary drum portion, the improvement which comprises said shaft being in electrically conductive contact with said rotary drum portion, and a grounding device provided in said stationary drum portion and held in electrically conductive contact therewith and in sliding electrically conductive contact with the peripheral surface of said shaft so as to provide a grounding path from said rotary drum portion through said shaft, grounding device, and said stationary drum portion.

2. A drum as set forth in claim 1, wherein said grounding device comprises a cylindrical member in said stationary drum portion surrounding said shaft and having a projection held in sliding contact with said peripheral surface thereof.

3. A drum as set forth in claim 2, wherein said cylindrical member has a wall provided with a hole so shaped as to form a tongue having a free end which defines said projection.

4. A drum as set forth in claim 2, wherein said cylindrical member has a wall provided with a hole so shaped as to form a tongue having a free end to which a sliding contact member in electrically conductive contact therewith is attached to define said projection.

5. A drum as set forth in claim 2, wherein said cylindrical member is formed from an electrically conductive and resilient material.

6. A drum as set forth in claim 3, wherein said cylindrical member is formed from an electrically conductive and resilient material.

7. A drum as set forth in claim 4, wherein said cylindrical member is formed from an electrically conductive and resilient material.

* * * * *